United States Patent
Chen et al.

(10) Patent No.: US 7,969,158 B2
(45) Date of Patent: Jun. 28, 2011

(54) NOISE-REDUCTION METHOD FOR PROCESSING A TEST PORT

(75) Inventors: I-Chen Chen, Taoyuan (TW);
Chien-Jung Lin, Taoyuan (TW);
Chien-Hsun Ho, San Diego, CA (US)

(73) Assignee: Foxconn Communication Technology Corp., Taoyuan County (TW)

( * ) Notice: Subject to any disclaimer, the term of this patent is extended or adjusted under 35 U.S.C. 154(b) by 431 days.

(21) Appl. No.: 12/135,451

(22) Filed: Jun. 9, 2008

(65) Prior Publication Data
US 2009/0179653 A1    Jul. 16, 2009

(30) Foreign Application Priority Data
Jan. 15, 2008   (CN) .......................... 2008 1 0001109

(51) Int. Cl.
*G01R 31/02*   (2006.01)
*G01R 29/26*   (2006.01)
*H01H 31/02*   (2006.01)

(52) U.S. Cl. .... 324/537; 324/555; 324/613; 324/759.01

(58) Field of Classification Search .................. 324/763, 324/537, 555, 613, 759.01
See application file for complete search history.

(56) References Cited

U.S. PATENT DOCUMENTS

| 5,014,002 | A | | 5/1991 | Wiscombe et al. | |
|---|---|---|---|---|---|
| 6,119,255 | A | * | 9/2000 | Akram | 714/724 |
| 6,229,378 | B1 | * | 5/2001 | Gourley et al. | 327/525 |
| 6,417,674 | B1 | * | 7/2002 | Rowell et al. | 324/601 |
| 6,921,288 | B2 | * | 7/2005 | Blondin et al. | 439/507 |
| 7,345,495 | B2 | * | 3/2008 | Dangelo et al. | 324/760 |
| 7,404,119 | B2 | * | 7/2008 | Hsieh | 714/724 |
| 7,672,805 | B2 | * | 3/2010 | Kushnick et al. | 702/125 |
| 2007/0046308 | A1 | * | 3/2007 | Baker et al. | 324/761 |
| 2009/0085579 | A1 | * | 4/2009 | Takeuchi et al. | 324/555 |

FOREIGN PATENT DOCUMENTS
CN        1929730 A     3/2007
* cited by examiner

*Primary Examiner* — Timothy J Dole
(74) *Attorney, Agent, or Firm* — Steven M. Reiss

(57) ABSTRACT

A noise-reduction method for processing a port is applied to a test target for testing or being burned in with software. At least one zero-Ohm resistor is provided with a first end thereof electrically connected to a device under test (DUT) of the test target and a second end thereof connected to a test port. Moreover, at least one grounding zero-Ohm resistor is provided with one end connected to ground and the other end is a floating end. After the test target is finished debugging or burned in with software, the connection of the first end and the DUT is disabled, and the second end is connected to ground through the floating end to reduce noise generation and improve a flexibility in circuit layout.

9 Claims, 4 Drawing Sheets

NOISE-REDUCTION METHOD FOR PROCESSING A TEST PORT

BACKGROUND OF THE INVENTION

1. Field of the Invention

The present invention relates to a method for processing a test port, and more specifically, to a noise-reduction method for processing a test port.

2. Description of the Related Art

With the development of technology, various communication devices have been produced one after the other. For an excellent transmitting and receiving performance and a fine communicating quality, a matchable antenna is applied to the communication device. On the other hand, a structure of preventing an electromagnetic interference may be added into the communication device to increase a receiving sensitivity and a communicating quality.

With the fine matchable antenna and the structure of preventing an electromagnetic interference, the receiving sensitivity and the calling quality of the communication device still may not be assured. Referring FIG. 1 and FIG. 2, a communication device has a mainboard 10. During the manufacturing, the mainboard 10 preserves a first terminal unit 101, and the first terminal unit includes a plurality of pins 102. When testing the mainboard 10, the pins 102 are connected in series with a plurality of resistors 103 to be connected to a second terminal unit 201 of a test port 20, for the mainboard 10 being finished debug or being burned in with software.

After the mainboard 10 being finished debugging or burned in with software, the resistors 103 are removed, and the second terminal unit 201 of the test port 20 is remained on the mainboard 10. Thereby, when using the communication device, radiating noise may be easily produced. However, in order to avoid the radiating noise, the circuit board layout will be limited, and it will result in the difficulty of the circuit board layout.

What is needed is a noise-reduction method for processing a test port, which can reduce noise to improve a flexibility in circuit layout.

SUMMARY OF THE INVENTION

The invention is to provide a noise-reduction method for processing a test port, which can reduce noise to improve a flexibility in circuit layout.

The noise-reduction method for processing a test port is applied to a test target for testing or being burned in with software. At least one zero-Ohm resistor is provided with a first end thereof electrically connected to a device under test (DUT) of the test target and a second end thereof connected to a test port. After the DUT is finished debugging or burned in with software, the connection of the first end and the DUT is disable (for example, by cutting off), and the first end is connected to ground to reduce noise generation and improve a flexibility in circuit layout.

Other objects, advantages and novel features of the invention will become more apparent from the following detailed description when taken in conjunction with the accompanying drawings, in which:

BRIEF DESCRIPTION OF DRAWING

These and other features and advantages of the various embodiments disclosed herein will be better understood with respect to the following description and drawings, in which like numbers refer to like parts throughout, and in which.

DETAILED DESCRIPTION OF THE INVENTION

Reference will now be made to the drawings to describe a preferred embodiment of the present noise-reduction method for processing a test port, in detail.

Figure 1:
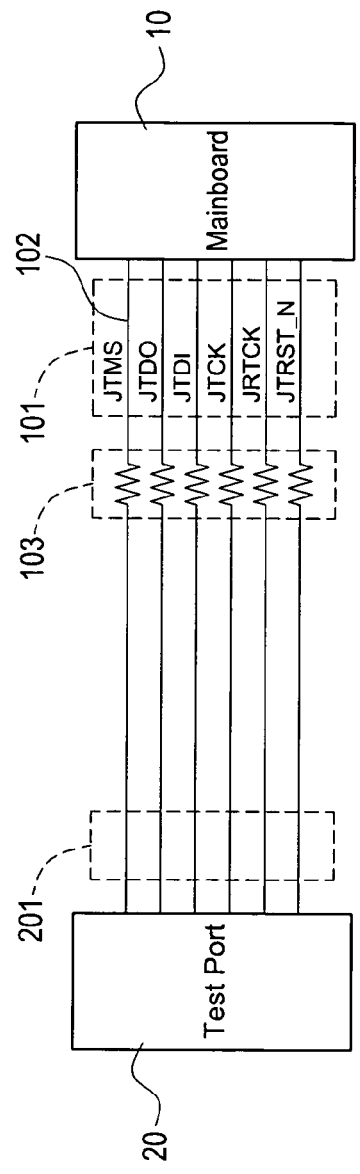
FIG. 1 is a partial schematic view of a conventional mainboard under a test.
Figure 2:
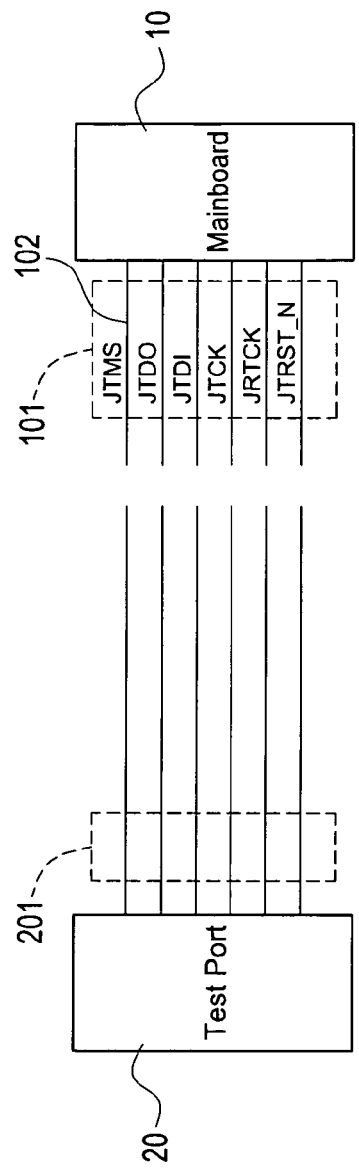
FIG. 2 is a partial schematic view of the mainboard in FIG. 1 after finishing the debug process.
Figure 3:
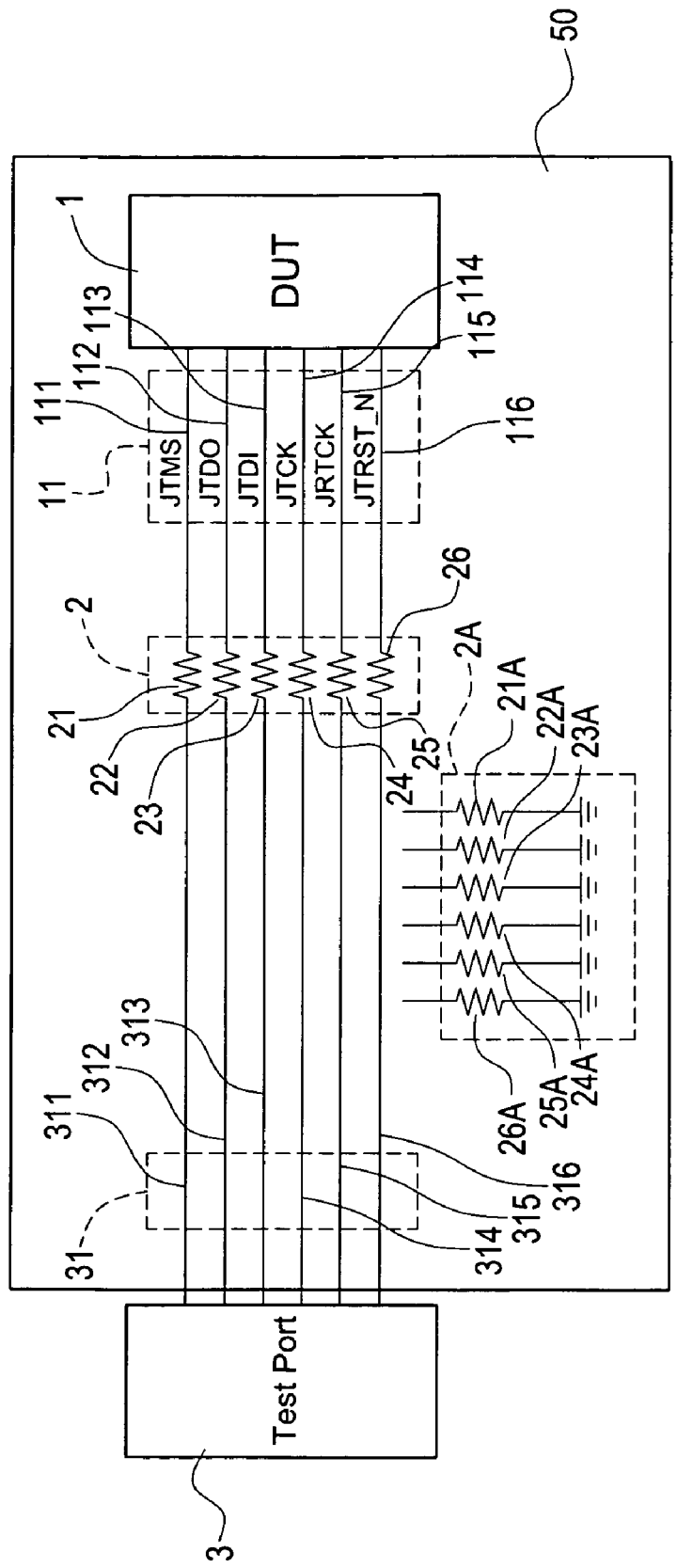
FIG. 3 is partial schematic view of a device under test (DUT) for being tested or burned in software, in accordance with the preferred embodiment of the invention.

Referring to FIG. 3, the noise-reduction method for processing a test port can be applied to a test target on a circuit board 50. The test target includes a device under test (DUT) 1, a connection zero-Ohm resistor unit 2, a grounding zero-Ohm resistor unit 2A, and a test port 3.

The DUT 1 is electrically connected with a first terminal unit 11, and the first terminal unit 11 includes a plurality of pins. In the plurality of pins, a first pin 111 may be a JTMS pin, a second pin 112 may be a JTDO pin, a third pin 113 may be a JTDI pin, a fourth pin 114 may be a JTCK pin, a fifth pin 115 may be a JRTCK pin, and a sixth pin 116 may be a JTRST_N pin. The first terminal unit 11 can be provided for testing the DUT, and can be also provided for electrically connecting with a soft burner to transmit the software for being burned into the DUT. In this embodiment, the DUT 1 is a CPU or a series of radio frequency chipsets.

The connection zero-Ohm resistor unit 2 includes a first resistor 21, a second resistor 22, a third resistor 23, a fourth resistor 24, a fifth resistor 25, and a sixth resistor 26. A first end of the first resistor 21 is electrically connected in series to the first pin 111 of the first terminal unit 11. A first end of the second resistor 22 is electrically connected in series to the second pin 112 of the first terminal unit 11. A first end of the third resistor 23 is electrically connected in series to the third pin 113 of the first terminal unit 11. A first end of the fourth resistor 24 is electrically connected in series to the fourth pin 114 of the first terminal unit 11. A first end of the fifth resistor 25 is electrically connected in series to the fifth pin 115 of the first terminal unit 11. A first end of the sixth resistor 26 is electrically connected in series to the sixth pin 116 of the first terminal unit 11.

The grounding zero-Ohm resistor unit 2A includes a first resistor 21A, a second resistor 22A, a third resistor 23A, a fourth resistor 24A, a fifth resistor 25A, and a sixth resistor 26A. One end in each of the first resistor 21A, the second resistor 22A, the third resistor 23A, the fourth resistor 24A, the fifth resistor 25A, and the sixth resistor 26A is floating (hereinafter floating ends); while the other end in each of the first resistor 21A, the second resistor 22A, the third resistor 23A, the fourth resistor 24A, the fifth resistor 25A, and the sixth resistor 26A is grounded.

The test port 3 is a connector, which includes a second terminal unit 31. The second terminal unit 31 includes a first pin 311, a second pin 312, a third pin 313, a fourth pin 314, a fifth pin 315, and a sixth pin 316. A second end of the first resistor 21 is electrically connected in series to the first pin 311 of the second terminal unit 31. A second end of the second resistor 22 is electrically connected in series to the second pin 312 of the second terminal unit 31. A second end of the third resistor 23 is electrically connected in series to the third pin 313 of the second terminal unit 31. A second end of the fourth resistor 24 is electrically connected in series to the fourth pin 314 of the second terminal unit 31. A second end of the fifth resistor 25 is electrically connected in series to the fifth pin 315 of the second terminal unit 31. A second end of the sixth resistor 26 is electrically connected in series to the sixth pin 316 of the second terminal unit 31. In another embodiment, the test port 3 is a signal node.

When the test target is finished debugging or burned in with software, the method determines whether the DUT is normal and the software is burned into the DUT by connecting with the test port 3.

Figure 4:
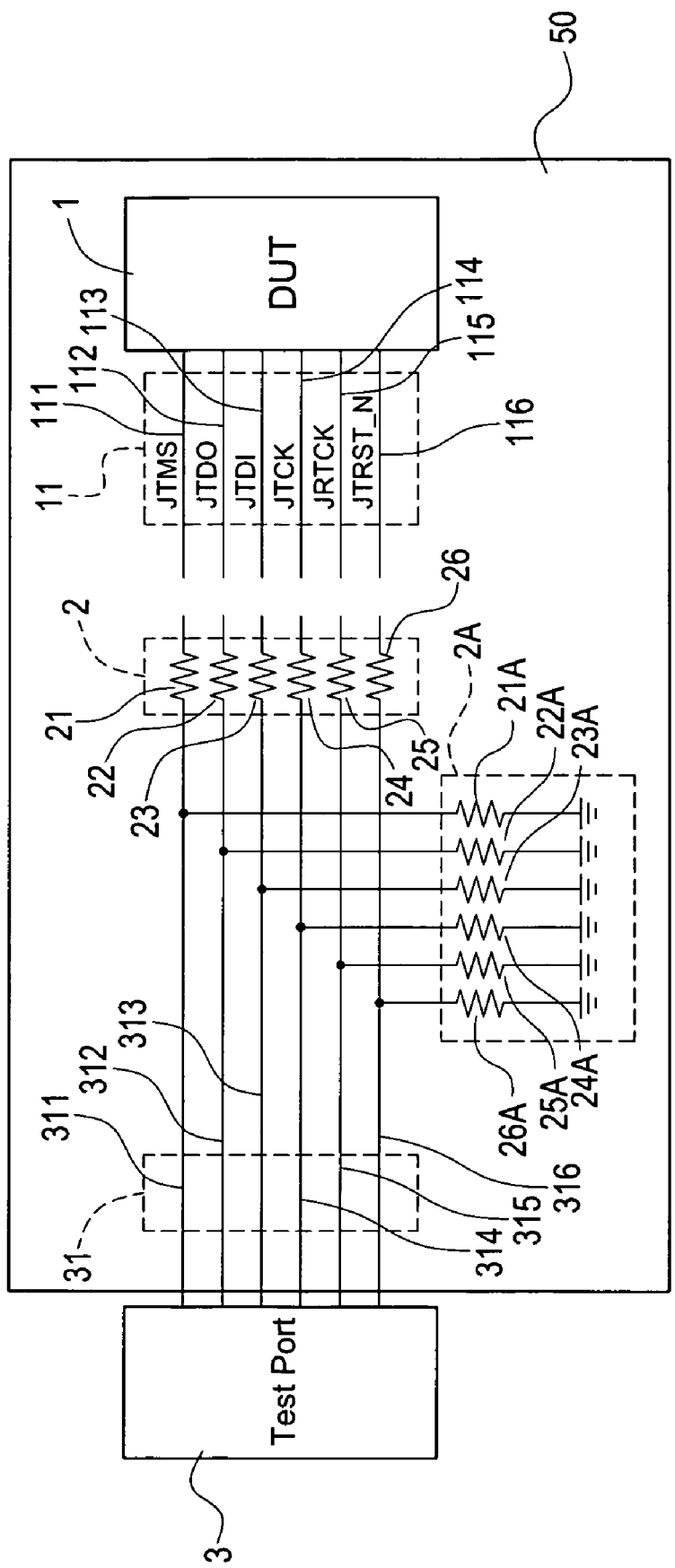
FIG. 4 is a partial schematic view of the lamp cover and the DUT in FIG. 3 after debug process or burned in software.

Referring to FIG. 4, after the DUT 1 is finished debugging or burned in software, the method continues to disable (for example, by cutting off) the connection of the first end of the first resistor 21 to the sixth resistor 26 of the zero-Ohm resistor unit 2 and the first pin 111 to the sixth pin 116 of the first terminal unit 11 of the DUT 1 to form an open circuit. After that, the method continues to connect the floating ends of all resistors (21A-26A) in the grounding zero-Ohm resistor unit 2A to the second ends of the first resistor 21 to the sixth resistor 26 of the zero-Ohm resistor unit 2 by soldering. In other word, the pins 311-316 in second terminal unit 31 are electrically connected respective resistors 21A-26A in the grounding zero-Ohm resistor unit 2A. Therefore, the pins 311-316 are grounded through the zero-Ohm resistors (21A-26A) to block a signal source, reduce noise generation, and get flexibility in the circuit layout. When the DUT 1 is an electronic communication product, the method can improve the receiving sensitivity and the communicating quality of the electronic communication product.

Figure 5:
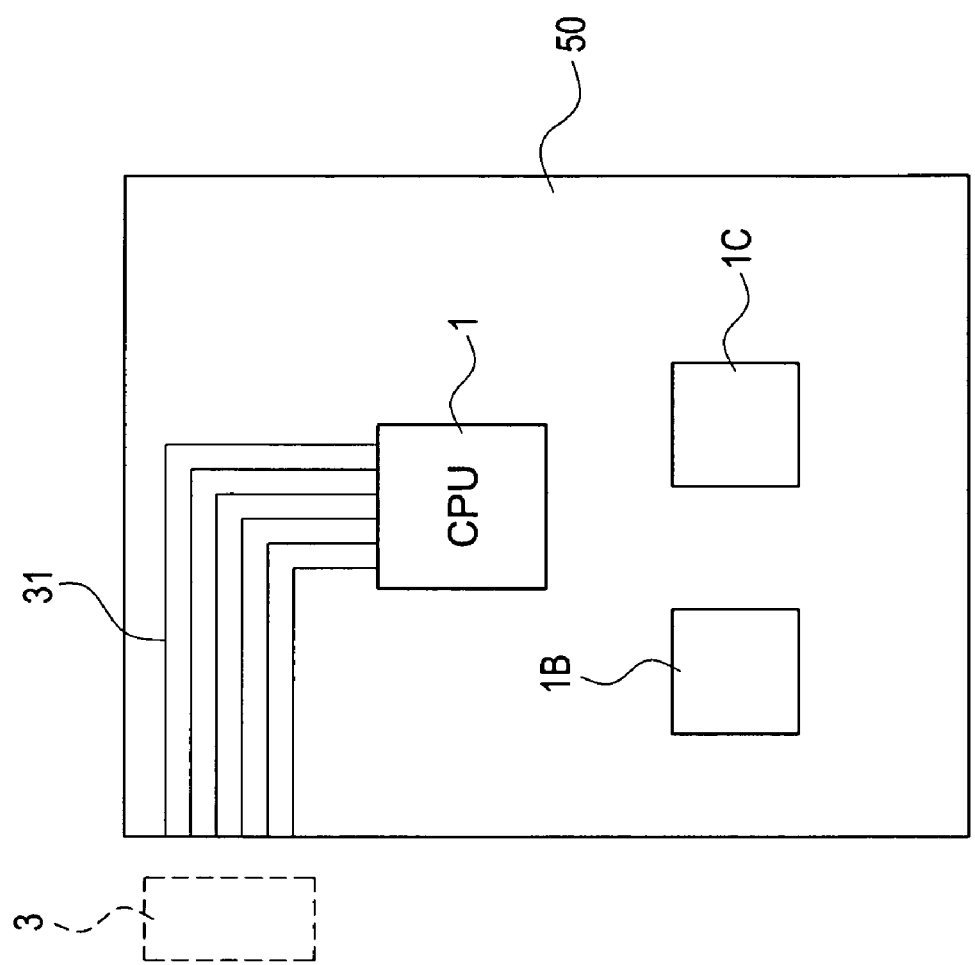
FIG. 5 shows an application of the method of the present invention.

FIG. 5 shows an application of the method of the present invention. The DUT 1 is, for example, a CPU, and is arranged on a circuit board 50. On the same circuit board 50 are arranged with other electronic blocks 1B and 1C. The second terminal unit 31 extends from the CPU 1 to peripheral of the circuit board 50, where the second terminal unit 31 is electrically connected to the test port 3 during debugging. The connection detail of the second terminal unit 31 to the connection zero-Ohm resistor unit 2 and the grounding zero-Ohm resistor unit 2A is omitted in FIG. 5 for clarity. After debugging, the second terminal unit 31 is grounded through the grounding zero-Ohm resistor unit 2A. Therefore, the second terminal unit 31 does not make electromagnetic interference during the operation of electronic equipment (such as a mobile phone) using the CPU 1. The CPU 1, which is electrically connected to the second terminal unit 31 in debugging phase, can be placed at proximity of electronic blocks 1B and 1C. Therefore, the routing of the CPU 1, the electronic blocks 1B and 1C can be more flexible.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A noise-reduction method for processing a test port (3), which can be applied to a test target for testing or burning software, the method comprising:
    providing a connection zero-Ohm resistor unit (2), a device under test (DUT) (1), a grounding zero-Ohm resistor unit (2A), and a test port (3), wherein each of the connection zero-Ohm resistor unit (2) and the grounding zero-Ohm resistor unit (2A) comprises a plurality of zero-Ohm resistors (21-26, 21A-26A), wherein each zero-Ohm resistor (21A-26A) in the grounding zero-Ohm resistor unit (2A) has a ground end connected to ground and a floating end;
    electrically connecting a first end of each zero-Ohm resistor (21-26) in the connection zero-Ohm resistor unit (2) with the DUT (1) in series, and electrically connecting a second end of each zero-Ohm resistor (21-26) in the connection zero-Ohm resistor unit (2) with the test port (3); and
    disabling the connection of the first ends of the zero-Ohm resistors (21-26) in the connection zero-Ohm resistor unit (2) and the DUT (1), and connecting the second ends of the zero-Ohm resistors (21-26) in the connection zero-Ohm resistor unit (2) to the floating ends of the zero-Ohm resistors (21A-26A) in the grounding zero-Ohm resistor unit (2A) to reduce noise generation.

2. The method as claimed in claim 1, wherein the DUT (1) is a CPU.

3. The method as claimed in claim 1, wherein the DUT (1) is a series of radio frequency chipsets.

4. The method as claimed in claim 1, wherein the DUT (1) is a handheld electronic device.

5. The method as claimed in claim 1, wherein the DUT (1) is a mobile communication device.

6. The method as claimed in claim 1, further comprising: providing a first terminal unit (11) electrically connected with the DUT (1), and electrically connecting the first terminal unit (11) to the first ends of the connection zero-Ohm resistor unit (2) by a plurality of pins (111-116).

7. The method as claimed in claim 1, further comprising: providing a second terminal unit (31) electrically connecting with the test port (3), wherein the second terminal unit (31) comprises a plurality of pins (311-316) and is electrically connected with the second end of the connection zero-Ohm resistor unit (2).

8. The method as claimed in claim 1, wherein the test port (3) is a connector.

9. The method as claimed in claim 1, wherein the test port (3) is a signal node.

* * * * *